(12) United States Patent
Struble et al.

(10) Patent No.: US 9,195,185 B1
(45) Date of Patent: Nov. 24, 2015

(54) APPARATUS AND METHOD FOR THERMALLY PROCESSING AN IMAGING MATERIAL EMPLOYING A MULTI-DRUM PROCESSOR

(71) Applicant: Carestream Health, Inc., Rochester, NY (US)

(72) Inventors: Kent R. Struble, Woodbury, MN (US); Joel C. Marsh, New Richmond, WI (US); Daniel J. Peick, Apple Valley, MN (US)

(73) Assignee: Carestream Health, Inc., Rochester, NY (US)

( * ) Notice: Subject to any disclaimer, the term of this patent is extended or adjusted under 35 U.S.C. 154(b) by 0 days.

(21) Appl. No.: 14/643,113

(22) Filed: Mar. 10, 2015

Related U.S. Application Data

(60) Provisional application No. 62/016,906, filed on Jun. 25, 2014.

(51) Int. Cl.
| | | |
|---|---|---|
| *G03G 13/06* | (2006.01) | |
| *G03G 15/06* | (2006.01) | |
| *G03G 15/20* | (2006.01) | |
| *G03D 13/00* | (2006.01) | |
| *G03B 27/30* | (2006.01) | |

(52) U.S. Cl.
CPC ............ *G03G 15/2028* (2013.01); *G03G 15/06* (2013.01); *G03B 27/306* (2013.01); *G03D 13/002* (2013.01); *G03G 13/06* (2013.01)

(58) Field of Classification Search
USPC ...................... 347/140, 158; 399/222; 355/27
See application file for complete search history.

(56) References Cited

U.S. PATENT DOCUMENTS

| | | | |
|---|---|---|---|
| 7,133,057 B2* | 11/2006 | Ohta | 347/140 |
| 7,158,164 B2 | 1/2007 | Okada | |
| 7,166,408 B2 | 1/2007 | Oyamada et al. | |
| 7,283,144 B2* | 10/2007 | Horiuchi et al. | 347/140 |
| 2004/0017467 A1* | 1/2004 | Torisawa | 347/223 |
| 2005/0052629 A1* | 3/2005 | Okada | 355/27 |
| 2005/0195271 A1* | 9/2005 | Denawa | 347/228 |

* cited by examiner

*Primary Examiner* — Huan Tran

(57) ABSTRACT

A method of thermally developing an image from a latent image recorded in an image formation layer of a photothermgraphic imaging media. The method includes heating the imaging media to a development temperature as the imaging media is transported along a surface of a first heated drum, the first heated drum having a diameter providing the imaging media with a radius of curvature that provides the imaging media with cross-web stiffness sufficient to prevent wrinkling of the imaging media when being heated to the development temperature. The method further includes maintaining the imaging media at the development temperature for a first portion of a development duration of the imaging media, transferring the imaging media to at least one second heated drum at the development temperature, and maintaining the imaging media at the development temperature for a remaining portion of the development duration as the imaging media is transported along a surface of the at least one second heated drum.

20 Claims, 6 Drawing Sheets

APPARATUS AND METHOD FOR THERMALLY PROCESSING AN IMAGING MATERIAL EMPLOYING A MULTI-DRUM PROCESSOR

CROSS REFERENCE TO RELATED APPLICATIONS

This application claims the benefit of U.S. Provisional application Ser. No. 62/016,906, provisionally filed on Jun. 25, 2014, entitled "APPARATUS AND METHOD FOR THERMALLY PROCESSING AN IMAGING MATERIAL EMPLOYING A MULTI-DRUM PROCESSOR", in the names of Kent R. Struble, et al., which is incorporated herein by reference in its entirety.

FIELD OF THE INVENTION

The present invention relates generally to an apparatus and method for processing an imaging material, and more specifically an apparatus and method for thermally developing an imaging material employing a multi-drum thermal processor.

BACKGROUND OF THE INVENTION

Photothermographic film typically includes a thin base material, such as a polymer, which is coated on at least one side with an emulsion of photosensitive and heat sensitive materials. After the film has been subjected to photo stimulation to form a latent image in the emulsion, such as via a laser imager, for example, a thermal processor is employed to develop an image from the latent image through application of heat to the film. Typically, a thermal processor raises the base material and emulsion to an optimal development temperature at which a chemical reaction of the emulsion occurs at an optimal rate. The thermal processor then maintains the film at the optimal development temperature for a required development duration to develop the image from the latent image.

One type of thermal processor is a drum processor. Drum processors typically employ a rotating heated drum having a series of rollers positioned about a segment of the drum's surface. Such rollers are sometimes referred to as "pressure rollers" and are biased against the drum. During development, rotation of the drum draws the photothermographic film between the pressure rollers and the drum, with the pressure rollers holding the photographic film against the drum so that heat is efficiently and evenly transferred from the drum to the photothermographic film.

In order to improve media throughput (i.e. the amount of imaging media that can be processed in a given time period), thermal processors typically raise the temperature of the photothermographic film to the development temperature as quickly as possible. Some types of thermal processors also quickly raise the temperature to the development temperature to ensure that chemical reactions in the emulsion proceed correctly (.e.g to ensure uniform development and a full range of optical densities). The size (i.e. diameter) of the drum is dependent on how quickly the film reaches the development temperature, the development duration of the photothermographic film, and the desired throughput of the thermal processor. Achieving an increase in throughput for a given type photothermographic film having a given development temperature and a given development duration typically requires an increase in the drum's diameter.

However, for some types of photothermographic film, the base material of a portion of the film contacting the drum rapidly expands in a cross-web direction (i.e. in a direction perpendicular to the direction of transport of the film about the drum) as the film is heated, while the base material of a remaining portion of the film that has not yet contacted the drum is not yet expanding. The difference in expansion rates between the heated and non-heated portions of the film causes the base material of the heated portion of the film to wrinkle and creates peaks and valleys in the cross-web direction of the film. The peaks and valleys absorb heat differently from the drum which causes them to develop to different densities which, in turn, produces visual artifacts.

There is a need to for an improved thermal processor that eliminates wrinkling of photothermographic film without sacrificing film throughput.

SUMMARY OF THE INVENTION

One embodiment provides a method of thermally developing an image from a latent image recorded in an image formation layer of a photothermgraphic imaging media. The method includes heating the imaging media to a development temperature as the imaging media is transported along a surface of a first heated drum, the first heated drum having a diameter providing the imaging media with a radius of curvature that provides the imaging media with cross-web stiffness sufficient to prevent wrinkling of the imaging media when being heated to the development temperature.

The method further includes maintaining the imaging media at the development temperature for a first portion of a development duration of the imaging media as the imaging media is transported along the surface of the first heated drum, transferring the imaging media at the development temperature to at least one second heated drum, and maintaining the imaging media at the development temperature for a remaining portion of the development duration as the imaging media is transported along a surface of the at least one second heated drum.

One embodiment provides a thermal processor for developing an image in an imaging media, the imaging media having a development duration at a development temperature for development of the image. The thermal processor includes a rotating first drum to heat the imaging media to the development temperature and maintain the imaging media at the development temperature for a portion of the development duration as the imaging media is transported along a surface of the first drum. A rotating second drum receives the imaging media from the first drum and maintains the imaging media at the development temperature for a remaining portion of the development duration as the imaging media is transported along a surface of the second drum. The first drum has a diameter which provides the imaging media with a radius of curvature that provides the imaging media with cross-web stiffness sufficient to prevent wrinkling of the imaging media when being heated to the development temperature.

One embodiment provides a method of thermally developing an imaging media. The method includes bending the imaging media to have a radius of curvature that provides the imaging media with cross-web stiffness sufficient to prevent wrinkling of the imaging media as the imaging media is transported along a first portion of a thermal development path and heated to a development temperature, wherein cross-web is in a direction lateral to movement the imaging media along the transport path. The method further includes maintaining the imaging media at the development temperature for a first portion of a development duration as the imaging is transported along the first portion of the thermal development path, and maintaining the imaging media at the development temperature for a remaining portion of the development duration as the imaging media is transported along a remaining portion of the thermal development path.

According to one embodiment, by providing the imaging media with a radius of curvature with a first heated drum to provide the imaging media with a crossweb stiffness sufficient to eliminate wrinkling as it is heated to a development temperature, and providing at least one second heated drum to maintain the imaging media at the development temperature for any remaining portion of a development duration, the present disclosure enables imaging media to be thermally developed without wrinkles without increasing processing time.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION OF THE INVENTION

The invention has been described in detail with particular reference to certain preferred embodiments thereof, but it will be understood that variations and modifications can be effected within the spirit and scope of the invention.

Figure 1:
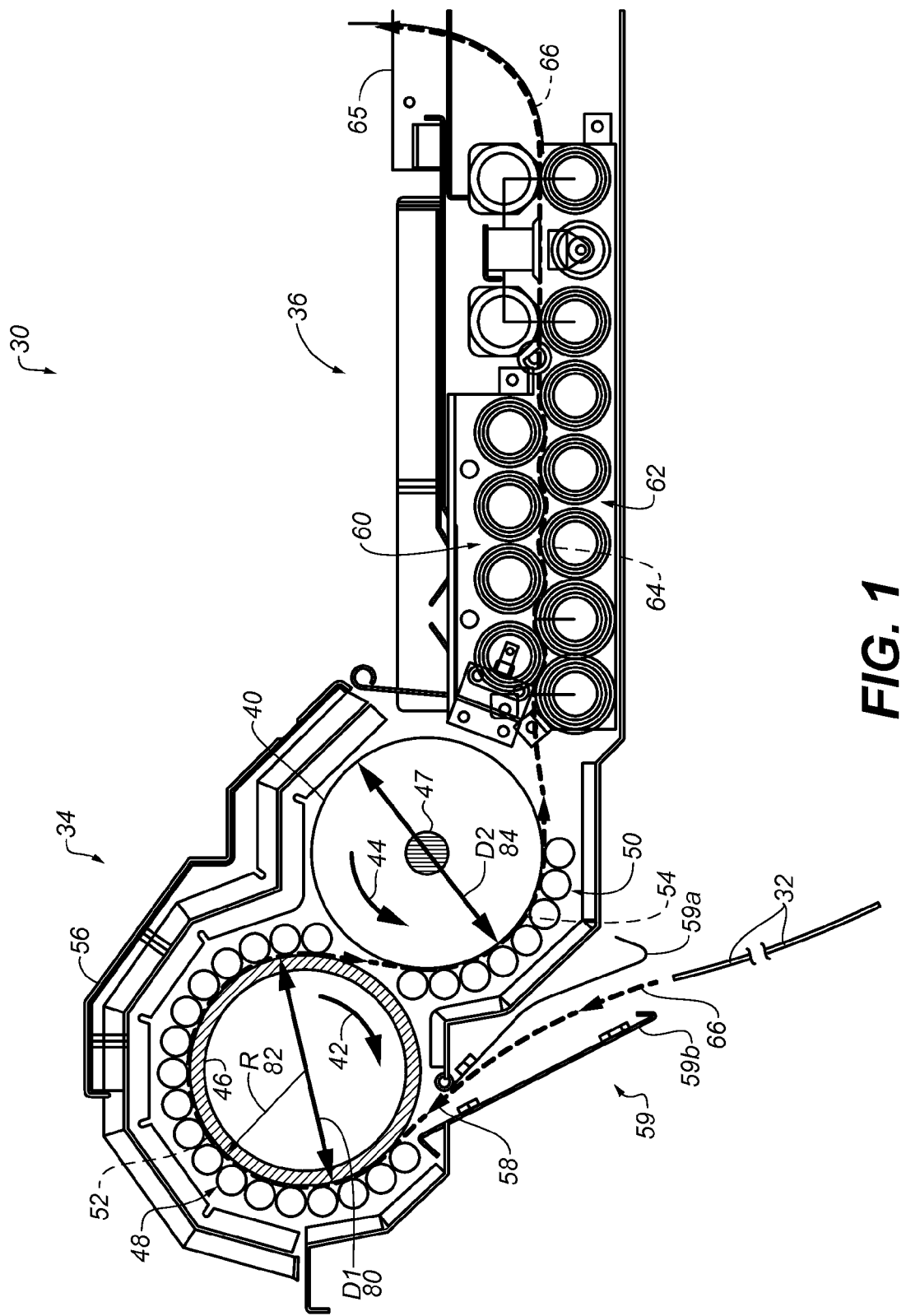
FIG. 1 is a cross-sectional view illustrating portion of thermal processor according to one embodiment.

FIG. 1 is a cross-sectional view illustrating portions of a multi-drum thermal processor 30, according to one embodiment of the present disclosure, for thermally developing a latent image in a photothermographic imaging media, such as imaging media 32, which eliminates wrinkling due to non-simultaneous heating of a base layer of the imaging media.

Thermal processor 30 includes a drum-type thermal development section 34 and a cooling section 36. In one embodiment, as illustrated, cooling section 36 is a roller-type cooling section. Thermal development section 34 includes a first drum 38 and a second drum 40, with first drum 38 being rotated in one direction, as indicated by directional arrow 42 (i.e. clockwise in FIG. 1), and second drum 40 being rotated in an opposite direction, as indicated by directional arrow 44 (i.e. counter-clockwise in FIG. 1). According to one embodiment, first drum 38 includes a circumferential heater 46, such as an etched foil resistive heater (sometimes referred to as a "blanket heater"), for example, which is continuously disposed about an interior surface of first drum 38. According to one embodiment, second drum 40 includes a radiant heater 47, such as an infrared lamp heater, disposed within an interior of second drum 40. Although described as respectively including a blanket heater and a radiant heater, other types of heaters may be employed for first and second drums 38 and 40.

A first plurality of pressure rollers 48 is circumferentially arrayed about a segment of first drum 38, and a second plurality of pressure rollers 50 is circumferentially arrayed about a segment of second drum 40, with first drum 38 and the first plurality of pressure rollers 48 together forming a first arcuate thermal development path 52, and second drum 40 and the second plurality of pressure rollers 50 together forming a second arcuate thermal development path 54.

Thermal development section 34 includes a housing 56 that encloses first and second drums 38 and 40 and defines an entrance 58. According to one embodiment, an entrance guide 59, including a pair of guide plates 59a, 59b, is positioned at entrance 58 and is configured to direct imaging media 32 to first drum 38 and to a nip formed by a first pressure roller 48a of the first plurality of pressure rollers 48 and first drum 38.

Cooling section 34 includes a plurality of laterally spaced apart upper rollers 60, and a plurality of laterally spaced apart lower rollers 62. The plurality of upper rollers 60 and the plurality of lower rollers 62 are vertically and laterally offset from one another and together form a corrugated, but generally planar, cooling path 64 along which media 32 is transported after exiting thermal development section 34. According to one embodiment, at least a portion of the upper and lower pluralities of rollers 60 and 62 are driven so as to transport imaging media 32 through cooling section 34 along cooling path 64 to an exit 65. The upper and lower pluralities of rollers 60 and 62 are configured to absorb heat from imaging media 32 so as to cool imaging media 32 after it has been heated by thermal development section 34.

Together, entrance guide 59, first arcuate thermal development path 52, second arcuate thermal development path 54, and cooling path 64 form a processing path 66 along which imaging media is transported by thermal processor 30 during thermal development.

Figure 2:
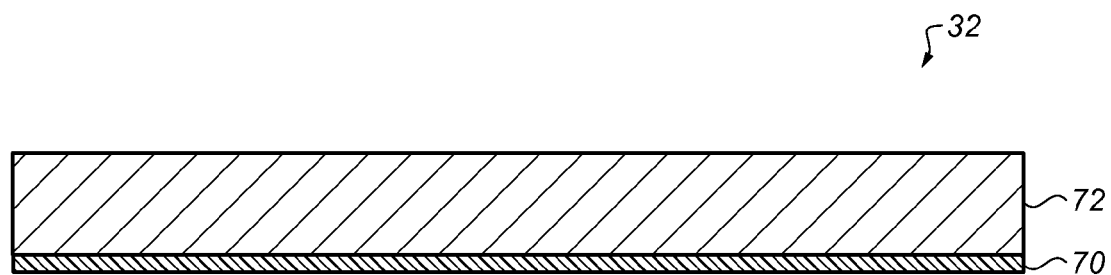
FIG. 2 is a cross-sectional view illustrating an example of a photothermographic imaging media according to one embodiment.

FIG. 2 is a cross-sectional view illustrating an example of photothermographic imaging media 32. Imaging media 32 includes a base layer 70 and an image formation layer 72 disposed thereon, such as an emulsion of photosensitive material, for example. According to one embodiment, base layer 70 comprises a polymer material (e.g. polyester). According to one embodiment, image formation layer 72 comprises an emulsion of dry silver or other photo and heat sensitive material. To produce a desired image, imaging media 32 is exposed to photostimulation which is representative of the desired image, such as via a laser imager, for example, to produce a latent image in image formation layer 72. A thermal processor, such as thermal processor 30, is then employed to heat imaging media 32 to thermally develop the image from the latent image.

Typically, there is a development temperature, or a development temperature range, at which a chemical reaction occurs at an optimal or desired rate in the emulsion of imaging layer 72 and at which significant density differences will be produced in the final image, with such density differences being representative of the differing amounts of photostimulation to which the emulsion was exposed during formation of the latent image. After heating imaging media 32 to the development temperature, the thermal processor must maintain the imaging media at the development temperature for a required development duration to optimally develop the image from the latent image.

It is noted that development temperatures and development durations may vary between different types of imaging media. For example, according to one embodiment, imaging media 32 has a development temperature of 124° C. with a development duration of approximately 13 seconds. In one embodiment, imaging media 32 has a development temperature in a range from 120° C. to 130° C. with a development duration in a range from 12-15 seconds, for example.

Drum processors typically employ a single rotating heated drum. During the thermal development process, rotation of the drum draws the imaging media between the drum and an array of pressure rollers disposed along a segment of the drum's circumference, with the pressure rollers holding the imaging media against the drum's surface so heat is efficiently transferred to the imaging media.

To increase media throughput, thermal processors typically raise the temperature of the photothermographic film from an ambient temperature to the development temperature as quickly as possible. Some types of thermal processors also raise the temperature quickly to ensure that chemical reactions proceed correctly in the emulsion. For drum-type thermal processors, the size of the rotating drum is dependent, to a great extent, on the development duration of the imaging media and the desired through put of the thermal processor. Due to the development durations of typical imaging media and expected throughput requirements of current thermal processors, the drum diameter can become quite large, such as 8-inches or more in diameter.

However, the rapid heating of the imaging media and large drum size can lead to wrinkling of the imaging media and produce undesirable visual artifacts in the final image. During the initial heating of the imaging media, such as imaging media 32, from an initial temperature (e.g. ambient temperature) to the development temperature, a portion of the imaging media on the drum is heated while a remaining portion that has yet to reach the drum remains at the ambient temperature.

In response to the rapid heating, the base layer 70 of the portion of imaging media 32 in contact with the drum begins to expand and also begins to lose strength and stiffness. However, the base layer 70 of the cooler portion of imaging media 32 that has not reached the drum remains substantially at the ambient temperature and has not yet begun to expand. The difference in expansion between the "hot" and "cool" portions of base layer 70 combined with the loss of stiffness and strength of the "hot" portion of imaging media 32 causes the base layer 70 to wrinkle. The wrinkles form peaks and valleys in the cross-web direction of imaging media 32 (i.e. in a lateral direction relative to movement of the imaging media in a longitudinal direction about the drum) and cause the image formation layer 72 to absorb heat differently from the drum and, consequently, to thermally develop to different optical densities. The different optical densities appear as visual artifacts in the final or developed image, such as light and dark streaks, for example.

Thermal processor 30, according to embodiments of the present disclosure, as will be described in greater detail below, eliminates such wrinkling of imaging media 32 by employing a multi-drum thermal development section 34 to heat imaging media 32. According to one embodiment, as illustrated by FIG. 1, thermal development section 34 includes a first drum 38, also referred to as an inlet drum, and a second drum 40, also referred to as an outlet drum.

In operation, entrance guide 59 directs imaging media 32 along processing path 66 to a nip formed between first drum 38 and a first pressure roller of the first plurality of pressure rollers 48. Rotation of first drum 38 draws imaging media 32 between a surface of first drum 38 and pressure rollers 48, with pressure rollers holding imaging media 32 against first drum 38. According to one embodiment, imaging media 32 is positioned so that image formation layer 72 is against first drum 38.

First drum 38 receives imaging media 32 at an ambient temperature and heats imaging media 32 to the desired thermal development temperature as imaging media 32 is transported along first arcuate thermal development path 52. According to the present disclosure, first drum 38 has a diameter, D1, as indicated at 80, which provides imaging media 32 with a radius of curvature, R, as indicated at 82, that is small enough to provide the imaging media with cross-web stiffness sufficient to prevent wrinkling of the imaging media 32 when being heated to the development temperature by first drum 38.

By providing imaging media 32 with a radius of curvature R 82 to provide heated imaging media 32 with crossweb stiffness required to eliminate wrinkling, diameter D1 80 is too small to enable first drum 38 to provide first arcuate thermal development path 52 with a length long enough to maintain imaging media 32 at the development temperature for the required development duration at a desired rate of throughput. As such, according to one embodiment, after heating imaging media 32 from the ambient temperature to the development temperature, first drum 38 maintains imaging media 32 at the development temperature for a portion of the development duration as imaging media 32 is transported about first drum 38 along first arcuate thermal development path 52.

According to one embodiment, second drum 40 receives imaging media 32 at the development temperature and has a diameter, D2, as indicated at 84, at least large enough to provide second arcuate thermal development path 54 with a length sufficient to maintain imaging media 32 at the development temperature for a remaining portion of the development duration as imaging media 32 is transported about second drum 38 along second arcuate thermal development path 54.

By providing first drum 38 with diameter D1 80 that is substantially smaller than the diameter of a single drum of a conventional processor, first drum 38 provides imaging media 32 with a radius of curvature R 82 that is smaller than that provided to imaging media 32 by the drum of a conventional drum type processor. By providing a smaller radius of curvature to imaging media 32, imaging media 32 has increased crossweb strength and stiffness relative to being developed on a conventional drum-type processor. The increased cross-web stiffness eliminates wrinkling of imaging media 32 when being heated from ambient temperature to the development temperature, and eliminates visual artifacts in the developed image that would otherwise be caused by wrinkling. In contrast to the smaller radius of curvature R 82 provided to imaging media 32 by first drum 38, the larger drums employed by conventional thermal processor are unable to provide imaging media with a radius of curvature small enough to provide crossweb stiffness sufficient to resist cross-web wrinkling.

Further, by providing second drum 40 with a diameter D2 84 large enough to provide second arcuate thermal development path 54 with a length sufficient to maintain imaging media 32 at the development temperature for a remaining portion of the development duration, thermal processor 30 is able to eliminate wrinkling of imaging media 32 and maintain a desired throughput.

According to one embodiment, first drum 38 has a diameter D1 80 not greater than 5-inches. According to one embodiment, first drum 38 has a diameter D1 80 of only 4-inches, which is half that of the 8-inch drum of at least one conventional single drum thermal processor, so that first drum 38 provides imaging media 32 with a radius of curvature R1 82 of 2-inches, which is twice as small as that provided by the conventional single drum processor. According to one embodiment, diameter D1 80 is in a range from 3-inches to 5-inches.

According to one embodiment, diameter D2 84 of second drum 40 is smaller than diameter D1 80 of first drum 38. According to one embodiment, diameter D2 84 is greater that diameter D1 80. According to one embodiment, for ease of manufacture, diameter D2 84 is the same as that of diameter D1 80.

Figure 3:
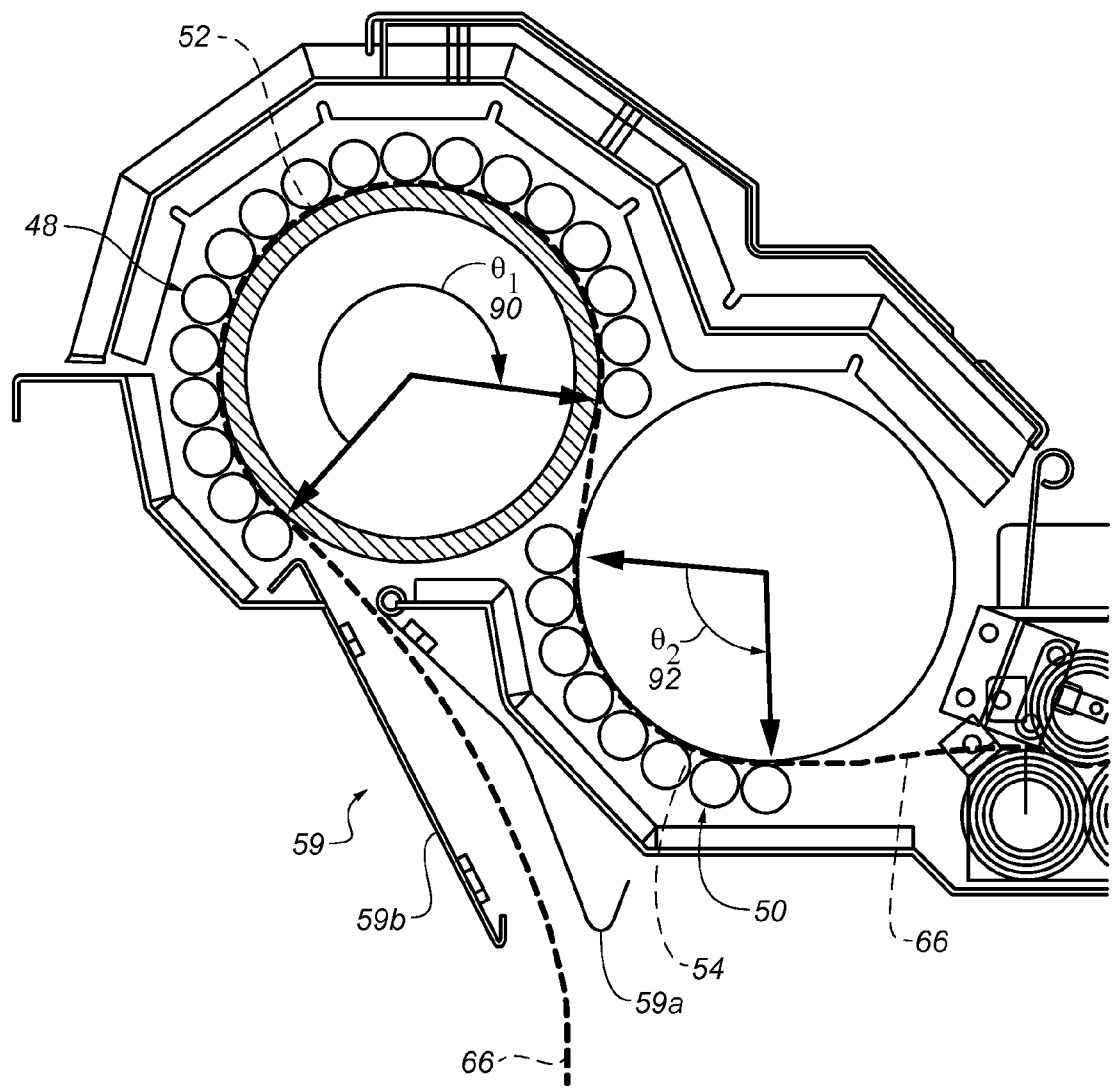
FIG. 3 is a cross-sectional view illustrating portions of the thermal processor of FIG. 1, according to one embodiment.

FIG. 3 is a cross-sectional drawing illustrating thermal development section 34 of FIG. 1. As illustrated, first drum 38 provides a wrap angle $\theta_1$, as indicated at 90, of imaging media 32 about the circumference of first drum 38 along first arcuate thermal development path 52 along which imaging media 32 contacts first drum 38. Similarly, second drum 40 provides a wrap angle $\theta_2$, as indicated at 92, of imaging media 32 about the circumference of first drum 38 along first arcuate thermal development path 52 along which imaging media 32 contacts first drum 38.

According to one embodiment, first drum 38 provides a wrap angle $\theta_1$ 90 of imaging media 32 about first drum 38 so that imaging media 32 is in contact with the circumferential surface of first drum 38 at least until first drum 38 heats imaging media 32 to the development temperature. According to one embodiment, first drum 38 provides a wrap angle $\theta_1$ 90 of approximately 30 degrees, at which point imaging media 32 has reached the development temperature.

According to one embodiment, second drum 40 provides a wrap angle $\theta_2$ 92 of imaging media 32 about second drum 40 so that imaging media 32 is in contact with the circumferential surface of second drum 40 at least until second drum 40 has maintained imaging media 32 at the development temperature for the remaining portion of the development duration. According to one embodiment, first drum 38 provides no portion of the development duration after heating imaging media 32 to the development temperature (i.e. wrap angle $\theta_1$ 90 is such that imaging media 32 contacts first drum 38 only until reaches the development temperature), such that second drum 40 provides wrap angle $\theta_2$ 92 so that imaging media contacts second drum long enough to provide the entire development duration of imaging media 32 at the development temperature. In one embodiment, wrap angle $\theta_2$ 92 is less than wrap angle $\theta_1$ 90. In one embodiment, wrap angle $\theta_2$ 92 is greater than wrap angle $\theta_1$ 90. In one embodiment, wrap angle $\theta_2$ 92 is equal to wrap angle $\theta_1$ 90.

Figure 4:
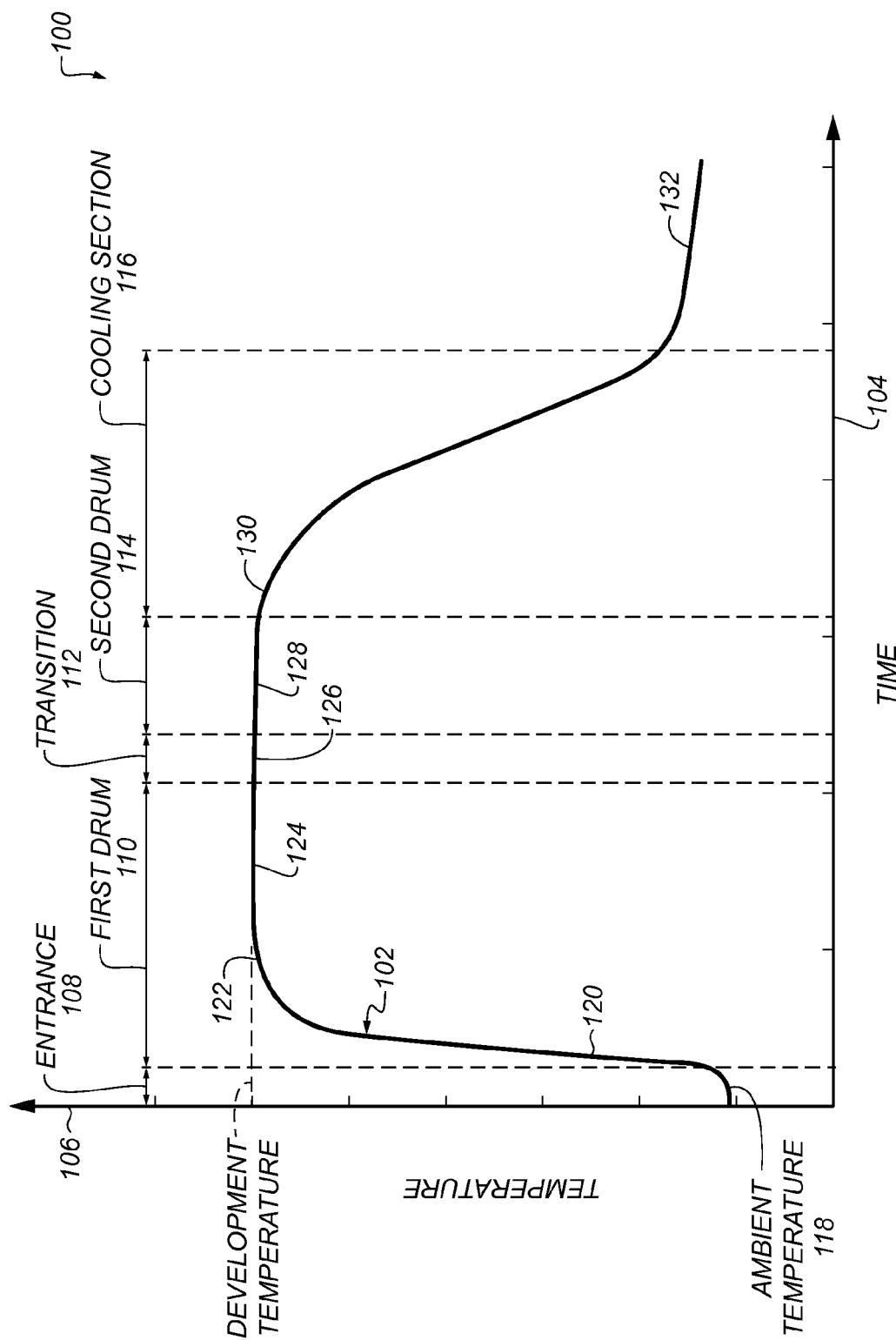
FIG. 4 is a graph generally illustrating a temperature versus time curve of a photothermographic imaging media during processing by the thermal processor of FIG. 1.

Although illustrated as including two heated drums 38 and 40, thermal processor 30, according to the present disclosure, may include more than two drums. According to such implementations, thermal processor 30 includes a first drum 38 and multiple second or outlet drums 40, and may be employed where an imaging media 32 requires an extended development duration or where transport path 66 requires a particular configuration that is not obtainable via use of only one second or outlet drum 40. According to such embodiments, the first inlet drum 38 heats imaging media 32 to the development temperature while providing imaging media 32 with a radius of curvature R 82 that provides the imaging media 32 with cross-web stiffness sufficient to prevent wrinkling of the imaging media 32 when being heated to the development temperature. After heating imaging media 32 to the development temperature, first drum 38 maintains imaging media 32 at the development temperature for a portion of the development duration (including where such portion of the development duration is "zero"). Subsequently, the two or more second or outlet drums 40 receive imaging media 32 at the development temperature and maintain imaging media 32 at the development temperature for a remaining portion of the development duration (including where such portion is the entire development duration FIG. 4 is a graph 100 illustrating a temperature versus time curve 102 of an imaging media, such as imaging media 32 as it travels through and is processed by thermal processor 30 as illustrated by FIG. 1. Time is illustrated along the x-axis, as indicated at 104, and temperature is illustrated along the y-axis, as indicated at 106. Graph 100 includes zones representative of different portions of thermal processor 30, with a zone 108 representative of an entrance region where imaging media 32 is entering thermal development section 34 via entrance guide 59, a zone 110 representing first drum 38, a zone 112 representing a transition area where imaging media is transferred from first drum 38 to second drum 40, a zone 114 representing second drum 40, and a zone 116 representing cooling section 36.

As imaging media 32 enters thermal drum processor 30 via entrance guide 59, it is at an ambient temperature level as indicated at 118. After being received by and contacting first drum 38, the temperature of imaging media 32 begins to rise, as indicated at 120, until the temperature of imaging media 32 reaches the desired development temperature, as indicated at 122. First drum 38 maintains imaging media 32 at the development temperature for a portion of the development duration as indicated at 124, until imaging media 32 transitions from first drum 38 to second drum 40.

During the transition from first drum 38 to second drum 40, imaging media 32 remains at the development temperature as indicated at 126, as the transition distance is limited and the position of first and second drums 38 and 40 create an oven-like effect substantially at the development temperature over the length of the transition. Second drum 40 receives imaging media 32 at the development temperature and maintains imaging media 32 at the development temperature for a remaining portion of the development duration as indicated at 128. As imaging media 32 transitions from second drum 40 to cooling section 36, the temperature of imaging media 32 begins to drop, as indicated at 130, until exiting cooling section and returning to substantially ambient temperature as indicated at 132.

Temperature curve 102 of imaging media 32 as thermally developed by thermal processor 30 according to the present disclosure is nearly identical to a similar temperature curve for imaging media 32 when developed by a conventional thermal processor employing a single, large diameter drum. As such, thermal processor 30 according to the present disclosure matches the development characteristics (e.g. optical densities) and throughput characteristics of a conventional thermal processor employing a single large diameter drum while eliminating wrinkles and resulting visual artifacts occurring during heating of imaging media 32 from ambient temperature to the development temperature.

Figure 5:
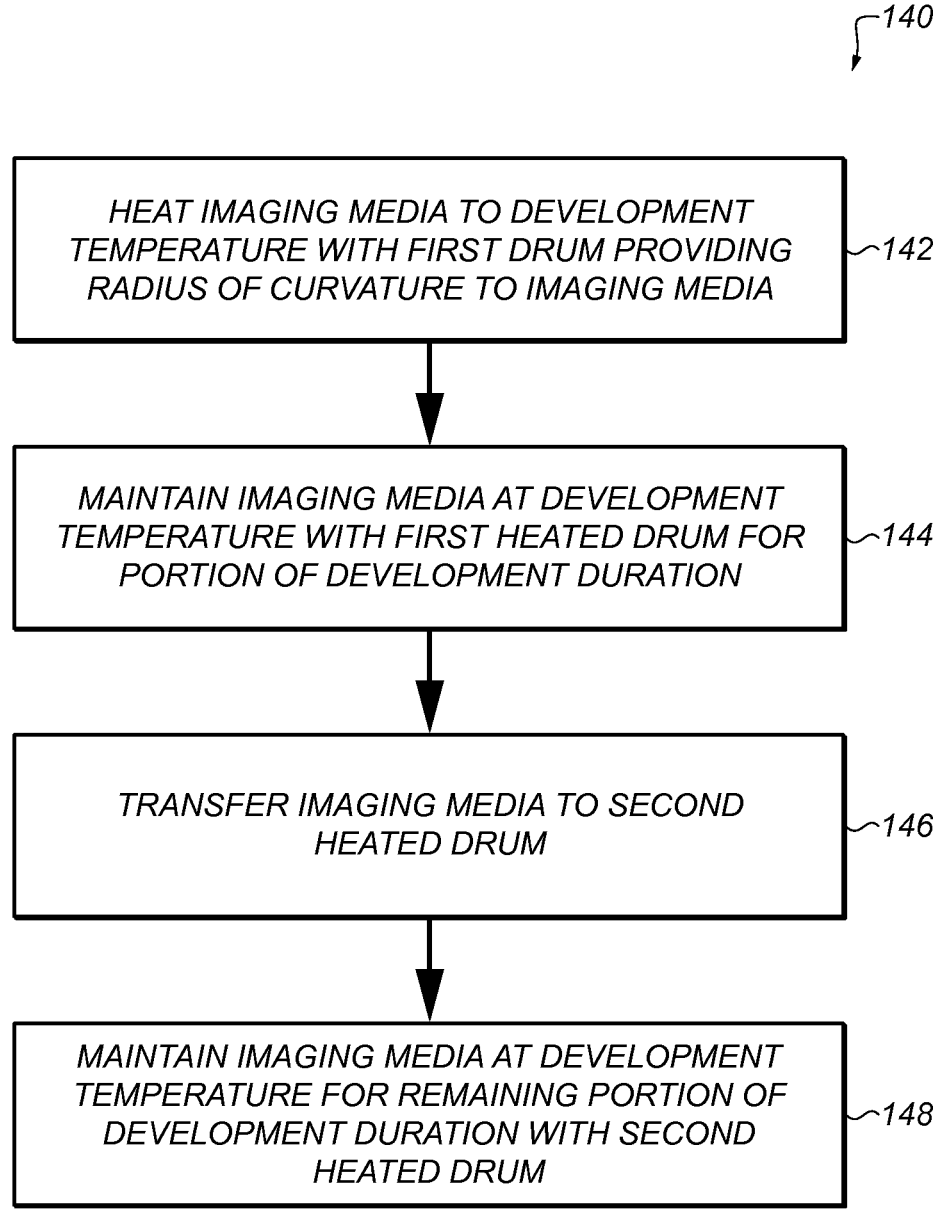
FIG. 5 is a flow diagram describing a method of thermally developing an imaging media, according to one embodiment.

FIG. 5 is a flow diagram of a method 140 for thermally developing an image from a latent image recorded in an image formation layer of a photothermgraphic imaging media. Method 140 proceeds at 142 with heating the imaging media to a development temperature as the imaging media is transported along a surface of a first heated drum, the first heated drum having a diameter providing the imaging media with a radius of curvature that provides the imaging media with cross-web stiffness sufficient to prevent wrinkling of the imaging media when being heated to the development temperature. According to one embodiment, the diameter of the first heated drum is in a range from 3 inches to 5 inches. In one embodiment, the method includes providing a wrap angle of the imaging media about the first drum so that the imaging media is in contact with the surface of the first drum at least until the imaging media is heated to the development temperature.

As 144, the imaging media is maintained at the development temperature for a first portion of a development duration of the imaging media as the imaging media is transported along the surface of the first heated drum. At 146, the imaging media is transferred at the development temperature to at least one second heated drum. At 148, the imaging media is maintained at the development temperature for a remaining portion of the development duration as the imaging media is transported along a surface of the at least one second heated drum. According to one embodiment, the method includes providing a wrap angle of the imaging media around the at least one second drum so that the imaging media is in contact with the surface of the at least one second drum unit the imaging media has been maintained at the development temperature for the remaining portion of the development duration. According to one embodiment the first portion of the development duration is zero, and the remaining portion of the development duration comprises the entire development duration.

Figure 6:
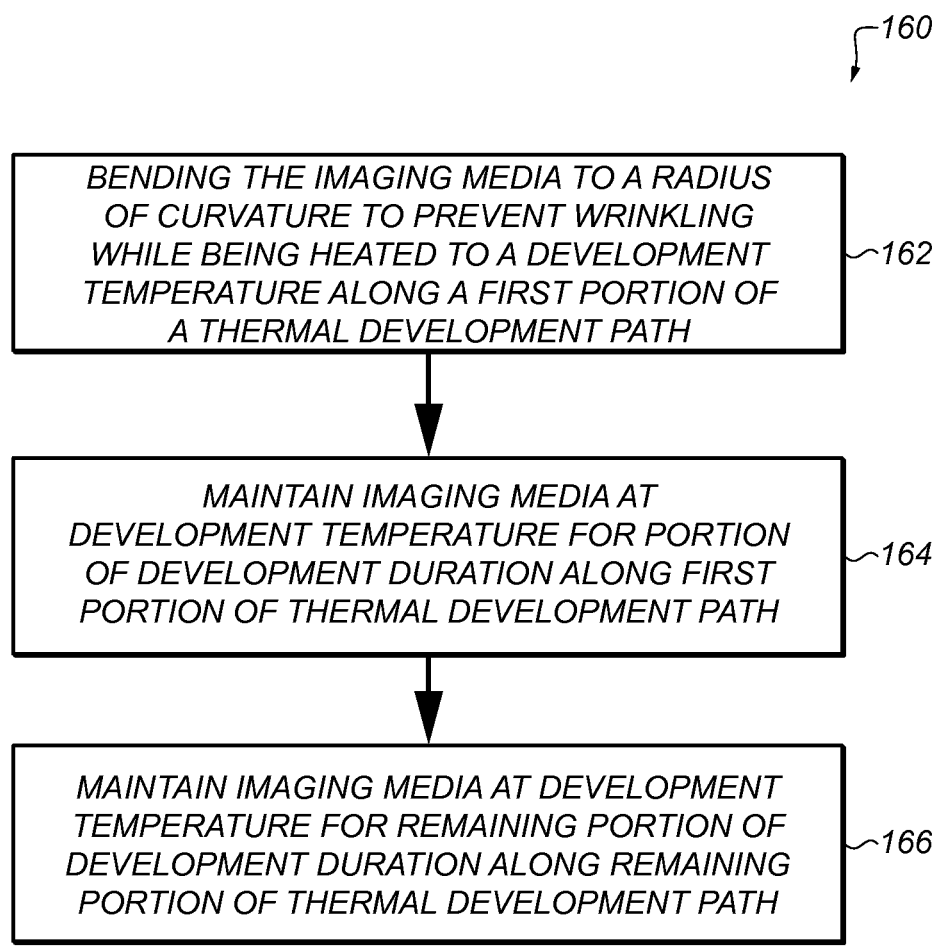
FIG. 6 is a flow diagram describing a method of thermally developing an imaging media, according to one embodiment.

FIG. 6 is a flow diagram of a method 160 for thermally developing an imaging media. Method 160 proceeds at 162 with bending the imaging media to have a radius of curvature that provides the imaging media with cross-web stiffness sufficient to prevent wrinkling of the imaging media as the imaging media is transported along a first portion of a thermal development path and heated to a development temperature. The cross-web is in a direction lateral to movement the imaging media along the transport path. According to one embodiment, the radius of curvature is not greater than 5 inches. According to one embodiment, the radius of curvature is in a range from 3 inches to 5 inches. According to one embodiment, the bending of the imaging media is provided by a first heated drum, with a circumferential surface of the first heated drum providing the first portion of the thermal development path.

At 164, the imaging media is maintained at the development temperature for a first portion of a development duration as the imaging is transported along the first portion of the thermal development path. At 166, the imaging media is maintained at the development temperature for a remaining portion of the development duration as the imaging media is transported along a remaining portion of the thermal development path. According to one embodiment, the remaining portion of the thermal development path is provided by a circumferential surface of a second heated drum.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of thermally developing an image from a latent image recorded in an image formation layer of a photothermgraphic imaging media, the method comprising:
   heating the imaging media to a development temperature as the imaging media is transported along a surface of a first heated drum, the first heated drum having a diameter providing the imaging media with a radius of curvature that provides the imaging media with cross-web stiffness sufficient to prevent wrinkling of the imaging media when being heated to the development temperature;
   maintaining the imaging media at the development temperature for a first portion of a development duration of the imaging media as the imaging media is transported along the surface of the first heated drum;
   transferring the imaging media at the development temperature to at least one second heated drum; and
   maintaining the imaging media at the development temperature for a remaining portion of the development duration as the imaging media is transported along a surface of the at least one second heated drum.

2. The method of claim 1, including providing a wrap angle of the imaging media about the first drum so that the imaging media is in contact with the surface of the first drum at least until the imaging media is heated to the development temperature.

3. The method of claim 1, including providing a wrap angle of the imaging media around the at least one second drum so that the imaging media is in contact with the surface of the at least one second drum unit the imaging media has been maintained at the development temperature for the remaining portion of the development duration.

4. The method of claim 1, wherein the diameter of the first heated drum is not greater than 5 inches.

5. The method of claim 1, wherein the diameter of the first heated drum is not greater than 4 inches.

6. The method of claim 1, wherein the diameter of the first heated drum is in a range from 3 inches to 5 inches.

7. The method of claim 1, wherein the at least one second heated drum comprises a single second drum.

8. The method of claim 7, wherein the second heated drum has a diameter equal to the diameter of the first drum.

9. A thermal processor for developing an image in an imaging media, the imaging media having a development duration at a development temperature for development of the image, the thermal processor comprising:
   a rotating first drum to heat the imaging media to the development temperature and maintain the imaging media at the development temperature for a portion of the development duration as the imaging media is transported along a surface of the first drum; and
   a rotating second drum which receives the imaging media from the first drum and maintains the imaging media at the development temperature for a remaining portion of the development duration as the imaging media is transported along a surface of the second drum,
   wherein the first drum has a diameter which provides the imaging media with a radius of curvature that provides the imaging media with cross-web stiffness sufficient to prevent wrinkling of the imaging media when being heated to the development temperature.

10. The thermal processor of claim 9, wherein the first drum provides a wrap angle of the imaging media about the first drum so that the imaging media is in contact with the first drum at least until the imaging media is heated to the development temperature.

11. The thermal processor of claim 9, the second drum provides a wrap angle of the imaging media about the first drum so that imaging media is in contact with the second drum at least until the imaging media has been maintained at the thermal development temperature for the remaining portion of the development duration.

12. The thermal processor of claim 9, wherein the first drum has a diameter not greater than 5 inches.

13. The thermal processor of claim 9, wherein the first drum has a diameter not greater than 4 inches.

14. The thermal processor of claim 9, wherein the first drum has a diameter in a range from 3 inches to 5 inches.

15. The thermal processoror of claim 9, wherein a first major surface of the imaging media contacts the surface of the first heated drum and an opposing second major surface of the imaging media contacts the surface of the second heated drum.

16. A method of thermally developing an imaging media comprising:
bending the imaging media to have a radius of curvature that provides the imaging media with cross-web stiffness sufficient to prevent wrinkling of the imaging media as the imaging media is transported along a first portion of a thermal development path and heated to a development temperature, wherein cross-web is in a direction lateral to movement the imaging media along the transport path;
maintaining the imaging media at the development temperature for a first portion of a development duration as the imaging is transported along the first portion of the thermal development path; and
maintaining the imaging media at the development temperature for a remaining portion of the development duration as the imaging media is transported along a remaining portion of the thermal development path.

17. The method of claim 16, wherein the radius of curvature is not greater than 5 inches.

18. The method of claim 17, wherein the radius of curvature is in a range from 3 inches to 5 inches.

19. The method of claim 16, wherein the bending of the imaging media is provided by a first heated drum, with a circumferential surface of the first heated drum providing the first portion of the thermal development path.

20. The method of claim 16, including providing the remaining portion of the thermal development path using a circumferential surface of a second heated drum.

* * * * *